Figure 1:
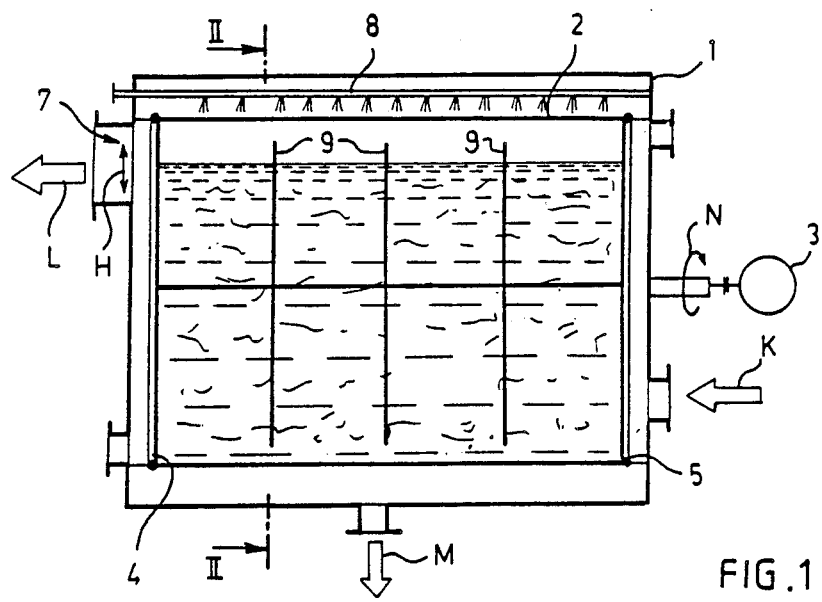

United States Patent [19]

Hautala et al.

[11] Patent Number: 4,705,631
[45] Date of Patent: Nov. 10, 1987

[54] THICKENER

[75] Inventors: Jouko Hautala; Esa Pikkujämsä, both of Tampere, Finland

[73] Assignee: Oy Tampella AB, Tampere, Finland

[21] Appl. No.: 864,780

[22] Filed: May 19, 1986

[30] Foreign Application Priority Data

Jun. 10, 1985 [FI] Finland .................................. 852302

[51] Int. Cl.⁴ ............................................ B01D 33/10
[52] U.S. Cl. ..................................... 210/403; 162/327
[58] Field of Search .................... 210/402, 403, 404; 162/323, 327, 328, 357; 209/288

[56] References Cited

U.S. PATENT DOCUMENTS 3,695,448 10/1972 Johannson ........................... 210/403
4,320,002 3/1982 Ihara .................................... 210/403

Primary Examiner—Frank Sever
Attorney, Agent, or Firm—Ladas & Parry

[57] ABSTRACT

A thickener has a receptacle in which a thickening drum having an axial filtering wall is mounted in a receptacle for rotation about an axis. A liquid-and-solid-materials mass to be thickened is introduced into the one axial end of the thickening drum. Thereby the solid materials contained in the mass to be filtered form a filtering layer on the inner surface of the a filtering wall and liquid filtrate from the mass flows through the filtering layer and wall into the receptacle. At least one barrier plate radially divides the inner space of the thickening drum into axially sequential spaces, the barrier plate being fixed within the thickening drum for rotation therewith. The barrier plate is provided with at least one opening axially therethrough for flow of the mass to be thickened and at least one opening axially therethrough for air flow in the axial direction of the thickening drum. The thickened mass is then discharged from the other axial end of the thickening drum.

8 Claims, 6 Drawing Figures

THICKENER

The invention relates to a thickener having a receptacle in which a thickening drum is mounted for rotation and devices for passing a mass to be thickened into the thickener and for discharging the thickened mass and a filtrate therefrom from the thickener.

Such thickeners are well-known in the pulp and paper making industries in particular. In general, they remove water from a mixture of water and solid materials while maintaining the mixture in pumpable form for transport as easily as possible. More particularly, they are not intended for the separation of solid materials from a liquid.

Thickening has been conventionally carried out in an apparatus wherein a dilute mixture of liquid and solid materials is pumped into a basin positioned outside of a drum rotating around the axis thereof. The filtrate liquid flows through a layer formed by the solid materials and a filtration wire or cloth inside the drum, wherefrom it flows further into a receptacle provided for it. The pressure difference required for the thickening is achieved by keeping the liquid level outside of the drum at a higher level than inside the drum. The highest pressure difference in apparatus is $0.5 \times$ drum diameter (liquid colums), and the highest area of filtration, 50 percent of the drum area. These matters are some of the drawbacks of the appratus, for the efficiency of the appratus is not the best possible. Sometimes, too, the filtration wire or cloth is washed by spraying water from outside the drum inwards, i.e. in the same direction as the filtrate flow through the wire. In practice, this procedure is disadvantageous because the layer of solid materials adhering to the surface of the wire is simultaneously pressed through the wire. An example of such known apparatus is disclosed in Finnish Patent Specification No. 22,541.

The object of the invention is to provide an apparatus which avoids the disadvantages of previously known apparatuses. This is achieved in an apparatus according to the invention by feeding a liquid-and-solid-material mass to be thickened into one axial end of a rotatable thickening jacket or drum having an axial filtering wall, whereby liquid is filtered from the solid materials through a filtering layer of the solid materials on the inner surface of the filtering wall of the thickening drum. This filtrate from the mass then flows out of the thickening drum through the filtering wall of the thickening drum into a receptacle. At least one barrier plate, which radially divides the inner space of the thickening drum into sequential axial spaces is fixed within the thickening drum for rotation therewith. The barrier platre has at least one opening axially therethrough for flow of the mass being thickened and at least one opening axially therethrough for air flow in the axial direction of the thickening drum. The thickened mass is then discharged from the thickening drum through an overflow port at one end.

An advantage of the apparatus according to the invention is the high efficiency thereof, for the pressure difference through the thickener can be easily increased to be 1.6 to 1.8 times. At the same time the area of the filtration is increased up to about 75 percent of the filter area of the thickening drum. This increases the filtration surface of the apparatus according to the invention extremely advantageously twofold or even fourfold as compared with a previously known apparatus of equal size. Also, plenty of filtration area per volume is achieved, wherefore the thickener can be pressurized in a highly advantageous manner.

Figure 2:
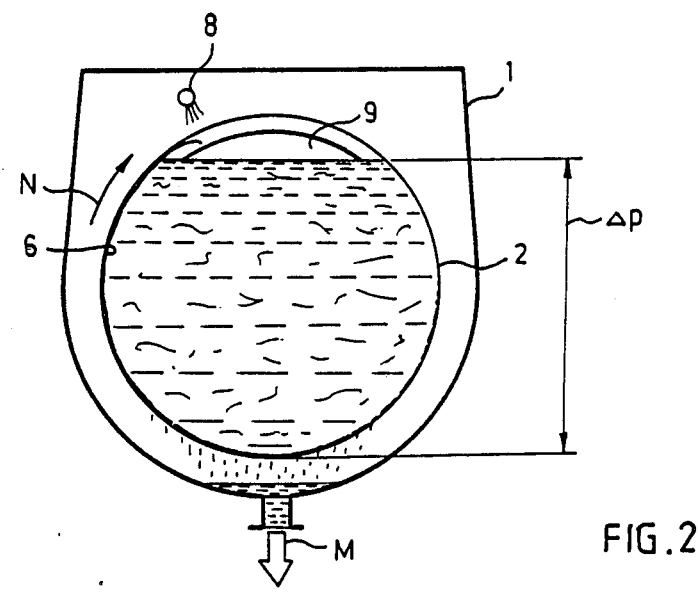

The invention will be described more closely below by means of certain preferred embodiments shown in the attached drawings, whereby FIG. 1 is a general side view of one embodiment of a thickener according to the invention, FIG. 2 is a sectional view of the thickener of FIG. 1 along the line II—II shown in FIG. 1, FIG. 3 is a general side view of another embodiment of the thickener according to the invention, FIG. 4 is a sectional view of the thickener of FIG. 3 along the line IV—IV shown in FIG. 3, FIG. 5 illustrates generally a constructional detail of a thickening drum of the thickener of FIGS. 1 and 2 and the operation thereof, and FIG. 6 illustrates generally a constructional detail of a thickening drum of the thickener of FIGS. 3 and 4 and the operation thereof.

In the embodiment of FIGS. 1 and 2 the reference numeral 1 designates a receptacle, and the reference numeral 2 designates the thickening drum. The thickening drum is provided with open ends and is mounted for rotation in the receptacle 1, which is mounted around the shaft of the drum. The thickening drum 2 is rotated by means of a motor 3 in a direction shown by the arrow N. The ends of the thickening drum 2 are sealed with sealing rings 4 and 5. Such sealings 4, 5 can be e.g. V-groove sealings or flat sealings. The thickener further comprises means for passing the mass to be thickened into the thickener and correspondingly means for discharging the mass and the filtrate from the thickener after the thickening step. An inlet for the mass to be thickened is indicated by the arrow K, an outlet for the thickened mass by the arrow L and an outlet for the filtrate by the arrow M.

According to the invention a mixture preferably having a solid material content of less than 2 percent is fed through the end of the receptacle 1 inside the thickening drum 2 for the thickening thereof. The solid materials contained in the mixture thereby forms a filtering layer 6 known per se on the inner surface of the thickening drum 2. Due to the position of the mass to be thickened the filtrate separated from the mass tends to flow through the filtering wall of the thickening drum 2 from inside the drum outwards so that the filtrate will be positioned on the bottom of the receptacle 1. A pressure difference $\Delta p$, which is of vital importance for the filtration, is also indicated in FIG. 2. As appears from the figure, this pressure difference can be increased to an extremely high value as compared with the known solutions. The same applies to the filtration area available. According to the invention the thickened mass is discharged from the thickening drum 2 through an overflow point 7 provided at one end of the receptacle 1, preferably at the upper end thereof.

According to the invention there is at least one barrier plate 9 provided within the thickening drum 2, which plate rotates with the drum and divides the inner space of the thickening drum into sequential spaces in the axial direction. Said barrier plate(s) 9 enable(s) the flow of the mass to be thickened to be controlled completely from one end of the thickener to the other, whereby the operating conditions of the thickener are considerably improved as compared with the prior art. The idea of barrier plate that the mixing is in the axial direction of the thickening drum is prevented so that the consistency of the mass continually thickens axially of the thickening drum. However, it is self-evident that the barrier plates 9 must be provided with openings both for the mass to be thickened and for air, since the apparatus would not operate as desired without such mass flow openings, and without the air openings the pressure would not be balanced within the thickening drum 2. The mass flow openings can be fitted in the barrier plate 9 in various ways as described below. The openings intended for the air-flow, instead, have to be positioned on the outer periphery of the plate 9, for they have to be positioned above the liquid level, when so rotated, so that the pressure can be balanced in an advantageous manner.

It has proved to be extremely advantageous in the thickener according to the invention to form the thickening drum 2 by fitting a filtration wire known per se on the frame structure of the drum, whereby the size of the wire openings and other properties of the wire can be chosen to suit the purpose in each particular case. In addition, there is a supporting wire tightened over the filtration wire, which supporting wire has such a durability that the thickening drum can be full of the mixture of liquid and solid materials to be thickened when the receptacle 1 is completely empty.

FIGS. 3 and 4 in turn show another preferred embodiment of the thickener according to the invention. This embodiment corresponds to that of FIGS. 1 and 2 in all essential parts. The essential difference lies in that a receptacle 21 in the embodiment of FIGS. 3 and 4 is pressurized. A thickening drum 22 is rotated by means of a motor 23. The ends of the thickening drum 22 are sealed by means of sealings 24 and 25. The feed of the mass to be thickened is indicated by the arrow K' and, correspondingly, the discharges of the mass which has been thickened and the filtrate by means of the arrow L' and M' respectively. The direction of rotation of the drum in turn is indicated by the arrow N'.

In principle, the mixture of solid materials is fed into the drum 22 in a manner similar to that of the embodiment of FIGS. 1 and 2, whereby a filtering layer 26 known per se is formed on the inner surface of the thickening drum 22. The flow of the filtrate equals to that described above in connection with FIGS. 1 and 2. A pressure difference $\Delta p$ is also indicated in FIG. 4. The mass which has been thickened correspondingly flows out of the drum through an overflow point 27.

According to the invention the filtration surface of the drum can be increased in an extremely advantageous manner so that it is manifold in comparison with the apparatuses of the prior art. Such an increase in the filtration area can be effected e.g. by providing the filtering wall of the filtration drum with a folded surface. This embodiment is shown in FIGS. 3 and 4. In other respects the structure of the filtration drum 22 equals to that described above in connection with FIGS. 1 and 2. At least one barrier plate 29 rotating with the drum 22 is provided within said drum, which plate divides the inner space of the drum in the axial direction into subsequent spaces similarly as described in connection with the embodiment of FIGS. 1 and 2. Flow openings for the mass to be thickened and for air can be located in the same way as in the embodiment of FIGS. 1 and 2. Naturally, the barrier plates in this embodiment operate as described in connection with FIGS. 1 and 2.

The flow openings of the barrier plates 9, 29 can be positioned in various ways, as mentioned above. Different kinds of alternatives are shown in outline in FIGS. 5 and 6. One ore more openings can be positioned essentially in the middle of the barrier plate(s) for the flow of a major part of the mass contained in the thickening drum. The air flow opening(s) is(are) positioned on the outer periphery of the barrier plate(s), whereby they are intermittently positioned above the liquid level during the rotation of the drum, thereby allowing the air to flow to the other side of the plate. The flow opening(s) for the mass to be thickened and for air can, however, also be positioned on the outer periphery of the barrier plate 9, 29. Said openings can also be distributed evenly over the whole area of the barrier plates, 9, 29, whereby the openings positioned on the outer periphery of the barrier plate serve as air flow openings when they are positioned above the liquid level of the mass to be thickened. In Figs. 5 and 6 the flow of the mass to be thickened and the flow of the air through openings of different positions are illustrated by means of arrows. The flow of the mass to be thickened, i.e. that of the mixture of liquid and solid materials, is outlined by means of the arrows NV, and the air flow in turn by the arrows IV.

The thickener according to the invention further comprises sprayings means 8, 28 known per se, which are positioned outside of the thickening drum 2, 22 at the upper portion thereof. Said spraying means 8, 28 are used for spraying a cleaning liquid to the filtering wall of the thickening drum 2, 22, which liquid can be e.g. water or filtrate from the thickener. This cleaning liquid is particularly efficient since the layer 6, 26 formed by the solid materials is not tried to be pushed through the surface. The direction of flow of the cleaning liquid is thereby reversed with respect to the direction of flow of the filtrate. Accordingly, the filtrating surface will be cleaned in an extremely efficient way.

A further advantage of the structure according to the invention is that the overflow level of the overflow point 7, 27 can be easily made vertically adjustable. This adjustability is indicated by means of the arrows H, H' in the figures.

The thickener according to the invention operates mainly in the following way. When the amount of mass pumped into the thickening drum 2, 22 to be thickened therein exceeds the amount of discharged filtrate flown through the surface of the drum, the liquid level inside the thickening drum starts to rise. The liquid level keeps rising until it reaches the overflow level of the overflow point 7, 27 provided at one end of the receptacle. The mass which has been thickened is passed through an overflow opening to further processing. The filtrate which has trickled into the basin is immediately discharged. The filtering layer 6, 26 formed by solid materials on the inner surface of the thickening drum 2, 22 falls down by the action of gravity during the rotation of the drum and is mixed with the contents of the drum.

The filtration surface of the thickening drum 2, 22 is washed from the outer surface towards the inside by means of the spraying means 8, 28, whereby the filtering layer 6, 26 adhering to the inner surface of the filtration drum is detached and falls downwards. The detachment of the filtrating layer 6, 26 and the cleaning of the wire can be particularly easily made more efficient by creating a slight underpressure at the upper end of the thickening drum by means of a blower so that air or gas flows against the direction of filtration. In this way the wire forming the filtering surface is maintained clean even when difficult materials are being treated. The blower, which creates the underpressure, can be connected e.g. to a connection point 9 (FIG. 1).

The consistency of the mass discharged from the thickener through overflowing is easily adjustable by varying the speed of rotation of the drum. By increasing the speed of rotation of the drum, the amount of filtrate is increased while the overflow amount is reduced, i.e. the mass becomes more consistent. The final consistency can be increased by means of the thickener according to the invention to any value, provided that the mass is still in liquid form.

The pressure difference used in the thickener can also be adjusted by varying the position of the overflow level or, if necessary, by adjusting the liquid level of the filtrate contained in the receptacle 1. Under normal circumstances the receptacle 1 is almost empty. At its highest the pressure difference Δp can be 1.8 times the drum diameter. In such a case the receptacle 1 is empty.

The embodiments described above are by no means intended to restrict the invention, but the invention can be modified in various ways within the scope of the claims. Accordingly, it is understood that the filter or the different parts thereof do not need to be exactly similar to those shown in the figures, but other kind of embodiments are possible as well. A folded surface of the filtration cylinder can be applied in the unpressurized embodiment, too, and an even surface correspondingly in the pressurized embodiment, if such modifications are considered necessary. Also, it is clear that the receptacle and the thickening drum can be provided with any necessary air discharge and emptying connections at points suited for the purpose and construction in each particular case. The barrier plate(s) can, of course, be fastened on the thickening drum in any suitable manner. So the barrier plates can be supported e.g. on a central support fitted on the axis of symmetry of the drum, whereby a gap can be left between the outer periphery of the barrier plates and the inner surface of the drum, which gap forms a flow opening for the mass or for the air, depending on the situation. However, it is also possible to secure the periphery of the barrier plates on the inner surface of the drum. Naturally, it is thereby necessary to provide the plates with flow openings for the mass and for the air. Barrier plates having different kinds of flow openings can be freely combined in one and the same thickening drum. An example of the use of different kinds of barrier plates would be the embodiments shown in FIGS. 5 and 6. Nor is the number of the barrier plates restricted in any way, but it can be chosen completely freely.

We claim:
1. A thickener comprising:
a receptacle (1,21);
a thickening drum (2,22) mounted in the receptacle for rotation about an axis and having an axial filtering wall, including liquid draining devices in the axial surface thereof;
means for passing a liquid-and-solid-materials mass to be thickened into one axial end of the thickening drum (2,22), for the solid materials contained in the mass being thickened to form a filtering layer (6,26) on the inner surface of the filtering wall of the thickening drum (2,22) for filtering therethrough, as a filtrate, liquid from the mass into the receptacle (1,21);
means for controlling the flow of the mass through the drum including, at least one barrier plate (9,29) for radially dividing the inner space of the thickening drum into axially sequential spaces fixed within the thickening drum (2,22) for rotation therewith, the barrier plate having at least one opening axially therethrough for flow of the mass being thickened and at least one opening axially therethrough for air flow in the axial direction of the thickening drum (2,22), for preventing mixing of the mass axially of the thickening drum, the consistency of the mass continually thickening axially of the thickening drum; and
means for discharging the mass from the other axial end of the thickening drum (2,22).

2. A thickener according to claim 1, wherein the at least one opening through the barrier plate (9,29) for the mass flow is radially innermore than the at least one opening for the air flow.

3. A thickener according to claim 1, wherein at least one of the openings through the barrier plate (9,29) is at the outer periphery of the barrier plate (9,29).

4. A thickener according to claim 1, wherein the openings through the barrier plate (9,29) for the mass and air flows are distributed evenly over the area of the barrier plate (9,29), whereby the openings positioned at the outer periphery of the barrier plate (9,29) serve for air flow when they are rotated with the thickening drum above the level of the mass to be thickened in the thickening drum.

5. A thickener according to claim 1, wherein the filtering wall of the thickening drum (2,22) comprises a filtration wire between a frame structure of the thickening drum and a supporting wire thereover.

6. A thickener according to claim 5, wherein the filtering wall of the thickening drum (2,22) is a folded surface.

7. A thickener according to claim 1, and further comprising spraying meams (8,28) radially outside the thickening drum (2,22) for spraying a cleaning liquid onto the filtering wall of the thickening drum (2,22), whereby the direction of the sprayed cleaning liquid is reversed with respect to the direction of flow of the filtrate.

8. A thickener according to claim 1, wherein the means for discharging the mass further comprises a vertically adjustable over-flow port for adjusting the level and, thereby, the pressure difference of the mass through the thickening drum.

* * * * *